United States Patent
Matsumoto (10) Patent No.: US 12,444,322 B2
(45) Date of Patent: Oct. 14, 2025

(54) SIMULATED BLOOD VESSEL AND ULCER MODEL USING SAME

(71) Applicant: DENKA COMPANY LIMITED, Tokyo (JP)

(72) Inventor: Mutsumi Matsumoto, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 176 days.

(21) Appl. No.: 18/290,076

(22) PCT Filed: Mar. 23, 2022

(86) PCT No.: PCT/JP2022/013431
§ 371 (c)(1),
(2) Date: Nov. 9, 2023

(87) PCT Pub. No.: WO2022/239490
PCT Pub. Date: Nov. 17, 2022

(65) Prior Publication Data
US 2024/0282219 A1    Aug. 22, 2024

(30) Foreign Application Priority Data
May 10, 2021   (JP) .................. 2021-079812

(51) Int. Cl.
G09B 23/30   (2006.01)
G09B 23/28   (2006.01)

(52) U.S. Cl.
CPC ......... G09B 23/303 (2013.01); G09B 23/285 (2013.01)

(58) Field of Classification Search
CPC ................. G09B 23/303; G09B 23/285
See application file for complete search history.

(56) References Cited

U.S. PATENT DOCUMENTS

| | | |
|---|---|---|
| 2012/0028231 A1 | 2/2012 | Misawa et al. |
| 2016/0284243 A1 | 9/2016 | Sekino et al. |
| 2017/0186340 A1 | 6/2017 | Ogawa et al. |
| 2018/0061279 A1 | 3/2018 | Niimi et al. |
| 2020/0160751 A1 | 5/2020 | Miyama et al. |
| 2021/0246314 A1 | 8/2021 | Matsumoto et al. |
| 2021/0353404 A1 | 11/2021 | Fujii et al. |
| 2022/0392373 A1 | 12/2022 | Matsumoto et al. |

FOREIGN PATENT DOCUMENTS

| | | |
|---|---|---|
| CN | 110895896 A | 3/2020 |
| CN | 112309217 A | 2/2021 |
| JP | 2006-116206 A | 5/2006 |

(Continued)

OTHER PUBLICATIONS

Jun. 7, 2022 Search Report issued in International Patent Application No. PCT/JP2022/013431.

*Primary Examiner* — Robert P Bullington
(74) *Attorney, Agent, or Firm* — Oliff PLC (57) ABSTRACT

A simulated blood vessel and an ulcer model are capable of replicating hemorrhaging and can be used to practice hemostasis using an energy device. The simulated blood vessel includes a tubular substrate layer and a conductive layer disposed on at least a portion of an outer surface of the substrate layer, wherein: the substrate layer is a substrate layer molded from a thermoplastic resin composition having a tensile modulus of elasticity of 0.01-50 MPa and a melting point of 50-200° ° C.; and the conductive layer contains a conductive polymer.

12 Claims, 3 Drawing Sheets

(56) References Cited

FOREIGN PATENT DOCUMENTS

| | | | |
|---|---|---|---|
| JP | 2006-326083 | A | 12/2006 |
| JP | 2008-197483 | A | 8/2008 |
| JP | 2010-187878 | A | 9/2010 |
| JP | 2015-85017 | A | 5/2015 |
| JP | 2016-177237 | A | 10/2016 |
| JP | 2018-102423 | A | 7/2018 |
| JP | 2018-178069 | A | 11/2018 |
| JP | 2020-36784 | A | 3/2020 |
| KR | 10-2013-0020087 | A | 2/2013 |
| WO | 2019/004374 | A1 | 1/2019 |
| WO | 2020/045552 | A1 | 3/2020 |
| WO | 2021/132204 | A1 | 7/2021 |

SIMULATED BLOOD VESSEL AND ULCER MODEL USING SAME

TECHNICAL FIELD

The present invention relates to a simulated blood vessel and an ulcer model using the same.

BACKGROUND

Recently, expectations have increased for minimally invasive surgery, such as surgery using an endoscope or a laparoscope, which has a low burden on the human body and from which early recovery can be expected, and the number of such cases has increased. For example, by stopping hemorrhaging in the digestive tract endoscopically (endoscopic hemostasis), shock due to hemorrhaging is prevented and emergency surgery is avoided, thereby reducing the physical burden on a patient. An early return to society is also expected due to a short hospitalization period.

Due thereto, there is increasing demand from doctors and medical students for technique practice models corresponding to surgery involving hemorrhaging. Hitherto, technique practice models for improving techniques and improving the quality of medical care have been proposed (Patent Documents 1, 2, and 3).

Patent Document 1: JP 2006-116206 A
Patent Document 2: JP 2008-197483 A
Patent Document 3: JP 2015-085017 A

SUMMARY OF THE INVENTION

However, these models did not adequately replicate hemorrhaging and could not be used to practice thermocoagulation using an endoscopic hemostasis energy device. Further, conventional ulcer models attached to the upper digestive tract or the lower digestive tract were for endoscopic observation and for practicing endoscope insertion and could not be used for hemostatic techniques.

Thus, there is a demand for a simulated blood vessel and organ model that replicate hemorrhaging, which is a problem in actual resection surgery and ablative surgery, and that can be used to practice thermocoagulation using an endoscopic hemostasis energy device.

The present invention addresses a problem of providing a simulated blood vessel and an ulcer model that are capable of replicating hemorrhaging and can be used to practice hemostasis using an energy device.

As a result of investigating various means, the present inventors discovered that by disposing a conductive layer on a tubular substrate layer using a thermoplastic resin having a specific tensile modulus of elasticity and a specific melting point, a simulated blood vessel was achieved which is capable of replicating hemorrhaging and can be used to practice hemostasis using an energy device, which led to the completion of the present invention.

The present invention relates to the following.

[1] A simulated blood vessel comprising a tubular substrate layer and a conductive layer disposed on at least a portion of an outer surface of the substrate layer, wherein:
the substrate layer is a substrate layer molded from a thermoplastic resin composition having a tensile modulus of elasticity of 0.01-50 MPa and a melting point of 50-200° C.; and
the conductive layer contains a conductive polymer.

[2] The simulated blood vessel described in [1], wherein the simulated blood vessel has a surface resistance value of $1.0 \times 100$-$1.0 \times 10^6 \Omega/\square$ at a location where the conductive layer is disposed.

[3] The simulated blood vessel described in [1] or [2], wherein the simulated blood vessel has a total light transmittance, measured in accordance with JIS K 7136-1, of 70% or more.

[4] The simulated blood vessel described in any one of [1]-[3], wherein the substrate layer has a diameter of 0.5-10.0 mm and a thickness of 0.1-2.0 mm.

[5] The simulated blood vessel described in any one of [1]-[4], wherein the substrate layer surface has a water contact angle of 45° or less.

[6] The simulated blood vessel described in any one of [1]-[5], wherein the thermoplastic resin composition contains a thermoplastic resin selected from the group consisting of ethylene-vinyl acetate-based resins, urethane-based resins, vinyl chloride-based resins, polybutadiene-based thermoplastic elastomers, and hydrogenated styrene-based thermoplastic elastomers.

[7] The simulated blood vessel described in any one of [1]-[6], wherein the conductive layer contains a π-conjugated conductive polymer.

[8] An ulcer model comprising an upper surface and a lower surface, which oppose one another, and the simulated blood vessel described in any one of [1]-[7] provided between the upper surface and the lower surface, wherein the ulcer model is to be used for practicing techniques including hemostasis.

[9] The ulcer model described in [8], wherein the simulated blood vessel is connected to a device that can supply simulated blood to the inside of the simulated blood vessel.

[10] The ulcer model described in [8] or [9], wherein the technique including hemostasis is endoscopic hemostasis.

[11] The ulcer model described in any of [8]-[10], wherein the hemostasis is hemostasis by thermocoagulation using an energy device.

[12] The ulcer model described in any one of [8]-[10], wherein the hemostasis is hemostasis by gripping the ulcer model surface with hemostatic forceps or clips.

According to the present invention, it is possible to provide a simulated blood vessel and ulcer model which are capable of replicating hemorrhaging and can be utilized to practice hemostasis using an energy device.

DESCRIPTION OF EMBODIMENTS

Hereinafter, embodiments of the present invention will be described in detail. The present invention is not limited to the following embodiments and can be implemented with modifications added, as appropriate, as long as the effects of the present invention are not inhibited.

First Embodiment

Figure 1:
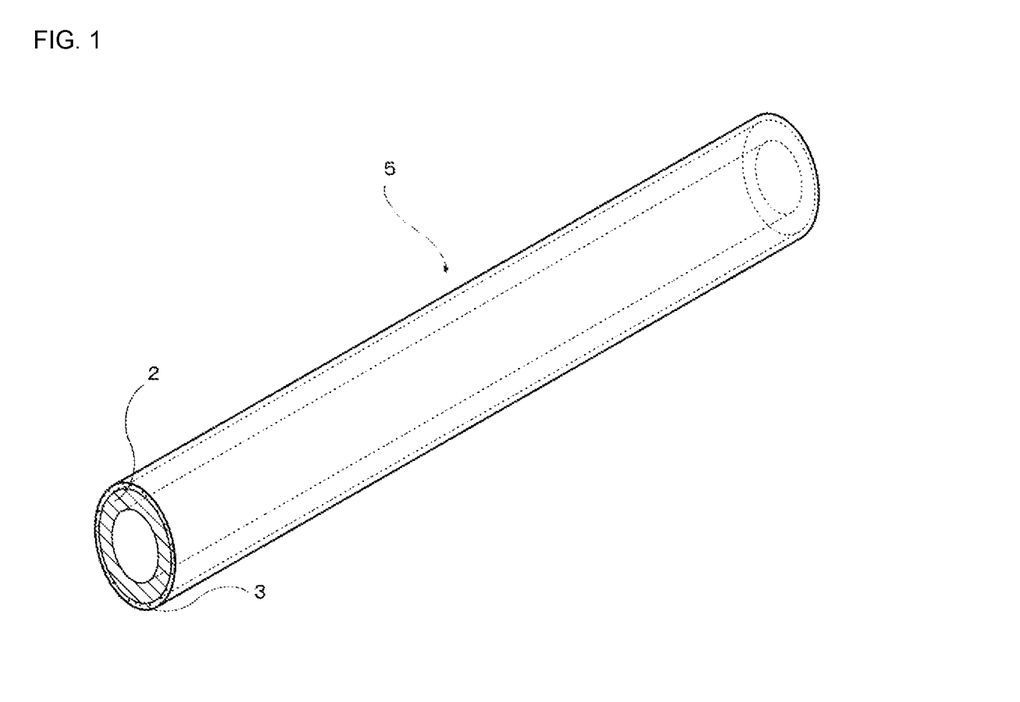
FIG. 1 shows a simulated blood vessel according to a first embodiment of the present invention.

FIG. 1 shows a simulated blood vessel according to the first embodiment of the present invention embodiment. In the present embodiment, a simulated blood vessel 1 is provided with a substrate layer 2 and a conductive layer 3.

Substrate Layer

The substrate layer is a tubular structure molded from a thermoplastic resin composition having a tensile modulus of elasticity of 0.01-50 MPa and a melting point of 50-200° C. The substrate layer may be a single layer structure molded from one thermoplastic resin composition or from a thermoplastic resin composition in which two or more thermoplastic resin compositions are alloyed. The substrate layer may also be a multi-layer structure molded using two or more thermoplastic resin compositions.

In one embodiment of the present invention, the diameter of the substrate layer, that is, the outer diameter thereof, is 0.5-10.0 mm. In another embodiment of the present invention, the diameter of the substrate layer is preferably 0.7-5.0 mm and more preferably 1.0-3.0 mm. By setting the diameter of the substrate layer so as to be 0.5 mm or more, processing stability during molding and handling during production of the ulcer model are increased, and by setting the diameter of the substrate layer so as to be 10.0 mm or less, replicability of a human blood vessel improves, and it is possible to suppress energization failures by an energy device.

The inner diameter of the substrate layer is preferably 0.3-9.8 mm, more preferably 0.3-3.6 mm, and even more preferably 0.4-2.0 mm.

In one embodiment of the present invention, the thickness of the substrate layer is 0.1-2.0 mm. The thickness of the substrate layer is preferably 0.2-0.7 mm and more preferably 0.3-0.5 mm. If the thickness of the substrate layer is 2.0 mm or less, when gripped by an energy device, heat is transferred in a short time and hemorrhaging in the substrate layer can be stopped.

In one embodiment of the present invention, the surface contact angle of the substrate layer is 45° or less. In another embodiment of the present invention, the surface contact angle of the substrate layer is preferably 30° or less and more preferably 20° or less. By setting the surface contact angle of the substrate layer so as to be 45° or less, it is possible to suppress the occurrence of defects such as pinholes in or repelling of a coating composition for forming a conductive layer comprising a TT-conjugated conductive polymer component, as well as suppressing the coating composition from peeling from the substrate layer.

In accordance with JIS K 6768 and using an automatic contact angle measurement device OCA20 manufactured by Eko Instruments, Co., Ltd., 1 μL of water (pure water) was dripped onto a primer layer surface and the contact angle when measured after 30 seconds was determined to be the contact angle in the present embodiment. Note that the measurement of the contact angle can be performed using a sample obtained by press-molding a thermoplastic resin composition, which is the material of the substrate layer, into a 1.0 mm thick resin sheet at 160-200° C.

The thermoplastic resin composition of the present embodiment mainly contains a thermoplastic resin. Here, "mainly contains" means that 50 mass % or more of a thermoplastic resin is contained in the thermoplastic resin composition. In another embodiment, the thermoplastic resin composition may contain 70 mass % or more or 90 mass % or more of the thermoplastic resin, or may consist entirely of the thermoplastic resin.

The thermoplastic resin composition used here has a tensile modulus of elasticity of 0.01-50 MPa. In one embodiment of the present invention, the tensile modulus of elasticity of the thermoplastic resin composition is preferably 0.05-30 MPa and more preferably 0.1-15 MPa. By setting the tensile modulus of elasticity so as to be 50 MPa, the simulated blood vessel is pressed flat due to being gripped by an energy device and it is possible to stop the hemorrhaging of simulated blood flowing in the simulated blood vessel.

In accordance with the JIS K 7127 plastic tensile testing method, a type 5 test piece shape is punched out from a 1.0 mm thick sheet, measurements are performed by using a tensile testing machine (Autograph AG-Xplus manufactured by Shimadzu Corporation) in an environment of 23±1° C. under conditions of a tensile speed of 50.0 mm/min., and the tensile modulus of elasticity is calculated from the slope of the initial straight line in a stress-strain curve.

The thermoplastic resin composition used in the present embodiment has a melting point of 50-200° C. In one embodiment of the present invention, the melting point of the thermoplastic resin composition is preferably 50-150° C. and more preferably 50-120° C. By using a thermoplastic resin composition with a melting point of 50° C. or more, it is possible to suppress shape changes in the resin composition caused by air temperature influences, and by using a thermoplastic resin composition with a melting point of 200° C. or less, material deformation caused by thermocoagulation using an energy device is enabled.

In the present embodiment, the melting point is measured in a nitrogen atmosphere at a temperature increase rate of 10° C./min. using a differential scanning calorimeter (DSC; DSC 3+manufactured by Mettler Toledo).

As long as the thermoplastic resin composition used in the present embodiment can satisfy the tensile modulus of elasticity and melting point described above, the thermoplastic resin contained therein is not particularly limited, but is preferably selected from the group consisting of ethylene-vinyl acetate-based resins, urethane-based resins, vinyl chloride-based resins, and thermoplastic elastomers. It is possible to preferably use, among the foregoing, a thermoplastic resin selected from the group consisting of ethylene-vinyl acetate copolymers, thermoplastic polyurethanes, vinyl chloride-based resins, polybutadiene-based thermoplastic elastomers, and hydrogenated styrene-based thermoplastic elastomers.

In the present embodiment, an ethylene-vinyl acetate-based resin is a resin that contains an ethylene-vinyl acetate copolymer. Said resin may contain a plurality of kinds of ethylene-vinyl acetate copolymers. The ethylene-vinyl acetate copolymer is a copolymer in which ethylene and vinyl acetate are copolymerized. However, chlorinated ethylene, vinyl chloride, vinylidene fluoride, or the like, may also be copolymerized therein. The content of the vinyl acetate in the ethylene-vinyl acetate-based resin is preferably 10-35 mass %, more preferably 15-35 mass %, and even more preferably 20-35 mass %. Setting the vinyl acetate content so as to be 10 mass % or more improves the flexibility of the simulated blood vessel. Further, setting the vinyl acetate content so as to be 35 mass % or less improves the heat resistance of the resin composition.

For the urethane-based resins, as a combination of an isocyanate and a polyol, which are raw materials, any combination of an MDI-based, an H12 MDI-based, an HDI-based, a TDI-based, an IPDI-based, an NDI-based, an XDI-based, an H6 XDI-based, or an NBDI-based isocyanate and a polyether-based, a polyester-based, or a polycarbonate-based polyol may be selected or a plurality thereof may be combined. A thermoplastic polyurethane is preferably used as the foregoing urethane-based resins and can be selected from among those generally commercially available and used.

As the vinyl chloride-based resin, a vinyl chloride homopolymer or a copolymer of vinyl chloride and another comonomer can be used. When the polyvinyl chloride is a copolymer, the polyvinyl chloride may be a random copolymer or may be a graft copolymer. One example of a graft copolymer is a copolymer in which, for example, an ethylene-vinyl acetate copolymer or a thermoplastic urethane polymer is used as the backbone polymer and vinyl chloride is graft polymerized thereto. The polyvinyl chloride of the present embodiment indicates an extrusion-moldable soft polyvinyl chloride and is a composition containing an additive such as a polymer plasticizer. A known polymer plasticizer can be used as the polymer plasticizer, and preferred examples thereof include ethylene copolymer polymer plasticizers such as an ethylene-vinyl acetate-carbon monoxide copolymer, an ethylene-(meth)acrylic acid ester-carbon monoxide copolymer, or an ethylene-vinyl acetate copolymer with a high vinyl acetate content.

The thermoplastic elastomer includes elastomers having a structure in which a soft polymer substance and a hard polymer substance are combined. Specific examples include styrene-based elastomers, hydrogenated styrene-based thermoplastic elastomers, olefin-based elastomers, vinyl chloride-based elastomers, polyamide-based elastomers, and polybutadiene-based thermoplastic elastomers. The foregoing elastomers can be selected from among those generally commercially available and used.

In one embodiment of the present invention, the substrate layer is formed by extrusion molding a thermoplastic resin composition. In another embodiment, the substrate layer is formed by cast molding, injection molding, or compression molding.

(Conductive Layer)

The conductive layer is a layer that is disposed on at least a portion of the outer surface of the substrate layer and contains a conductive polymer. In the present embodiment, "disposed on at least a portion" means that the conductive layer is disposed so as to have at least a surface area necessary for use in thermocoagulation by an energy device. In one embodiment of the present invention, the conductive layer has a surface area of less than 5%, 5% or more, 10% or more, 30% or more, 50% or more, 70% or more, or 90% or more of the outer surface of the substrate layer.

In one embodiment of the present invention, the thickness of the conductive layer is 20-2,000 nm. The thickness of the conductive layer is preferably 50-1,000 nm and more preferably 150-500 nm. Setting the thickness of the conductive layer so as to be 20 nm or more enables a sufficiently high conductivity to be exhibited and improves the smoothness of the substrate layer surface. Setting the thickness of the conductive layer so as to be 2,000 nm or less enables the conductive layer coating thickness to be thinner and a decrease in the total light transmittance of the substrate layer can be suppressed.

(Conductive Polymer)

In one embodiment of the present invention, the conductive polymer is a π-conjugated conductive polymer. As long as the π-conjugated conductive polymer is an organic polymer having a main chain configured as a Π-conjugation and the effects of the present invention are exhibited, there are no particular limitations thereon and examples thereof include polythiophene-based conductive polymers, polypyrrole-based conductive polymers, polyacetylene-based conductive polymers, polyphenylene-based conductive polymers, polyphenylene vinylene-based conductive polymers, polyaniline-based conductive polymers, polyacene-based conductive polymers, polythiophene vinylene-based conductive polymers, and copolymers thereof. From the perspective of stability in air, polypyrrole-based conductive polymers, polythiophene-based conductive polymers, and polyaniline-based conductive polymers are preferable, and from a transparency aspect, polythiophene-based conductive polymers are more preferable.

Examples of the polythiophene-based conductive polymers include polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butylenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), and poly(3-methyl-4-carboxybutylthiophene).

Examples of the polypyrrole-based conductive polymers include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), and poly(3-methyl-4-hexyloxypyrrole).

Examples of the polyaniline-based conductive polymers include polyaniline, poly(2-methylaniline), poly(3-isobutylaniline), poly(2-aniline sulfonic acid), and poly(3-aniline sulfonic acid).

Among the π-conjugated conductive polymers described above, from the perspective of conductivity, transparency, and heat resistance, poly(3,4-ethylenedioxythiophene) is particularly preferable.

The π-conjugated conductive polymers described above may be used alone or as a combination of two or more.

The conductive polymer in another embodiment of the present invention further contains a polyanion.

A polyanion is a polymer containing, within a molecule thereof, two or more monomer units having an anion group. The anion group of the polyanion functions as a dopant with respect to the π-conjugated conductive polymer and improves the conductivity of the π-conjugated conductive polymer.

It is preferable for the anion group of the polyanion to be a sulfo group or a carboxy group.

Specific examples of such a polyanion include: polymers having a sulfonic acid group such as polystyrene sulfonic acid, polyvinyl sulfonic acid, polyallyl sulfonic acid, polyacrylic sulfonic acid, polymethacrylic sulfonic acid, poly(2-acrylamido-2-methylpropane sulfonic acid), polyisoprene sulfonic acid, polysulfoethyl methacrylate, poly(4-sulfobutyl methacrylate), and polymethacryloxybenzenesulfonic acid; and polymers having a carboxylic acid group such as polyvinyl carboxylic acid, polystyrene carboxylic acid, polyallyl carboxylic acid, polyacrylic carboxylic acid, polymethacrylic carboxylic acid, poly(2-acrylamido-2-methylpropane carboxylic acid), polyisoprene carboxylic acid, and polyacrylic acid. The polyanion may be a homopolymer of a polymer described above and may be a copolymer of two or more kinds thereof.

Among the foregoing polyanions, since it is possible to further raise antistatic properties, a polymer having a sulfonic acid group is preferable, with polystyrene sulfonic acid being more preferable.

The polyanions described above may be used alone or as a combination of two or more.

The mass average molecular weight of the polyanion is preferably 20,000 or more and 1,000,000 or less and more preferably 100,000 or more and 500,000 or less.

The mass average molecular weight herein is measured using gel permeation chromatography and is a value determined with polystyrene serving as a standard substance.

The content ratio of the polyanion in a conductive composite containing the π-conjugated conductive polymer and the polyanion is preferably in the range of 1 part by mass or more and 1,000 parts by mass or less, more preferably in the range of 10 parts by mass or more and 700 parts by mass or less, and even more preferably in the range of 100 parts by mass or more and 500 parts by mass or less with respect to 100 parts by mass of the π-conjugated conductive polymer. When the content ratio of the polyanion is less that the lower limit value described above, the doping effect on the π-conjugated conductive polymer tends to be weaker, conductivity may be insufficient, and further, the dispersibility of the conductive composite in a dispersion fluid reduces. Meanwhile, when the content of the polyanion exceeds the upper limit value described above, the content of the π-conjugated conductive polymer becomes low, and it is difficult to obtain sufficient conductivity.

The conductive composite is formed by doping by coordinating the polyanion with the π-conjugated conductive polymer.

Note that in the polyanion in the present embodiment, not all anion groups are doped on the π-conjugated conductive polymer, and there are surplus anion groups which do not contribute to doping.

[Dispersion Medium]

Examples of the dispersion medium used in one embodiment of the present application include water, organic solvents, and mixed liquids comprising water and an organic solvent.

Examples of the organic solvent include ester-based solvents, ether-based solvents, hydrocarbon-based solvents, nitrogen atom-containing solvents, alcohol-based solvents, and ketone-based solvents, etc.

Examples of the ester-based solvent include ethyl acetate, propyl acetate, and butyl acetate, etc.

Examples of the ether-based solvent include diethyl ether, dimethyl ether, ethylene glycol, propylene glycol, propylene glycol dialkyl ether, and diethylene glycol diethyl ether, etc.

Examples of the hydrocarbon-based solvent include hexane, cyclohexane, pentane, octane, decane, dodecane, benzene, toluene, xylene, ethylbenzene, propylbenzene, and isopropylbenzene, etc.

Examples of the nitrogen atom-containing solvent include N-methylpyrrolidone, dimethyl acetamide, and dimethylformamide, etc.

Examples of the alcohol-based solvent include methanol, ethanol, 1-propanol, 2-propanol, 2-methyl-2-propanol, 1-butanol, 2-butanol, 2-methyl-1-propanol, allyl alcohol, propylene glycol monomethyl ether, and ethylene glycol monomethyl ether, etc.

Examples of the ketone-based solvent include diethyl ketone, methyl propyl ketone, methyl butyl ketone, methyl isopropyl ketone, methyl isobutyl ketone, methyl amyl ketone, diisopropyl ketone, methyl ethyl ketone, acetone, and diacetone alcohol, etc.

The solvents described above may be used alone or as a combination of two or more.

Among the dispersion media described above, at least one solvent selected from the group consisting of ester-based solvents, hydrocarbon-based solvents, ether-based solvents, and N-methylpyrrolidone is preferable. Furthermore, among the dispersion media described above, at least one solvent selected from the group consisting of ethyl acetate, butyl acetate, heptane, toluene, and diethylene glycol diethyl ether is preferable.

The content of the conductive polymer in the dispersion fluid of the present embodiment is preferably 0.1 mass % or more and 80 mass % or less, more preferably 0.5 mass % or more and 50 mass % or less, and even more preferably 1 mass % or more and 30 mass % or less with respect to the total mass of the dispersion fluid. If the content of the conductive polymer in the dispersion fluid is no less than the lower limit value described above, a conductive layer having a sufficient thickness can easily be formed with one coating. If the content of the conductive polymer in the dispersion fluid is no more than the upper limit value described above, the dispersibility of the conductive polymer in the dispersion fluid can be made higher.

(Transparent Binder Component)

The liquid dispersion in one embodiment of the present invention contains a transparent binder component as well as the conductive polymer. Examples of the transparent binder component include transparent compounds such as thermoplastic resins, thermosetting compounds, and photo-curable compounds. The thermoplastic resin serves, as-is, as the binder resin described later. The thermosetting compound and the photo-curable compound are each a monomer or an oligomer. The thermosetting compound is thermally cured to become the binder resin described later, and the photo-curable compound is photo-cured to become the binder resin described later.

If the dispersion fluid contains a transparent binder component as well as a conductive polymer, it is easy to form a conductive layer having transparency, conductivity, and anti-reflection properties.

Examples of the transparent binder component include acrylic resins, polystyrene, styrene-acryl copolymers, polycarbonates, polyethylene terephthalate, polybutylene terephthalate, polyethylene naphthalate, cyclic polyolefins, polyester resins, polyurethane resins, polyimide resins, melamine resins, acrylic compounds having one or more acryloyl groups, and epoxy compounds having two or more epoxy groups, etc.

Among the transparent binder components described above, examples of the thermoplastic resin include acrylic resins, polystyrene, styrene-acryl copolymers, polycarbonates, polyethylene terephthalate, polybutylene terephthalate, polyethylene naphthalate, and cyclic polyolefins, etc.

Among the transparent binder components described above, examples of the thermosetting compounds include acrylic compounds and epoxy compounds.

Examples of the photo-curable compounds include acrylic compounds.

Among the transparent binder components described above, photo-curable acrylic compounds are preferred due to having high transparency, being easy to cure, and having low cost.

The transparent binder component may be used alone or as a combination of two or more.

When the transparent binder component is a thermosetting compound, the conductive particle dispersion fluid preferably contains a thermal polymerization initiator, and when the transparent binder component is a photo-curable compound, conductive particle dispersion fluid preferably contains a photopolymerization initiator.

The content of the transparent binder component in the dispersion fluid of the present embodiment is preferably 0.1 parts by mass or more and 1,000 parts by mass or less, more preferably 10 parts by mass or more and 800 parts by mass or less, and even more preferably 100 parts by mass or more and 500 parts by mass or less with respect to 100 parts by mass of the conductive polymer. If the content of the transparent binder component in the conductive particle dispersion fluid of the present embodiment is no less than the lower limit described above, the strength of the conductive layer can be improved. If the content of the transparent binder component in the conductive particle dispersion fluid of the present embodiment is no more than the upper limit described above, it is possible to prevent a decrease in conductivity due to the content of the conductive composite becoming low.

The dispersion fluid of the present embodiment preferably contains at least one particle selected from the group consisting of inorganic compound particles, polymeric particles (but excluding conductive particles), metal particles, and carbon. When the dispersion fluid of the present embodiment includes at least an inorganic compound particle or a polymeric particle, the transparency and conductivity of the conductive polymer may decrease. When the dispersion fluid of the present embodiment includes at least a metal particle or carbon, the transparency of the conductive polymer may decrease.

In one embodiment of the present invention, the conductive layer is formed by coating an outer surface of the substrate layer with a dispersion fluid in which a conductive polymer is dispersed in a dispersion medium. In another embodiment, the conductive layer is formed by performing a method in which the substrate layer is immersed in a conductive polymer dispersion fluid, etc.

Before coating with the conductive polymer dispersion fluid, it is preferable for the substrate layer to undergo a corona discharge treatment, a plasma discharge treatment, a flame treatment, or the like, to form a hydrophilic group (hydroxyl group, carbonyl group, carboxyl group, etc.) on the substrate layer surface. When the substrate layer is treated so as to become hydrophilic, conductive layer adhesiveness can be further improved.

(Simulated Blood Vessel)

In the present embodiment, a simulated blood vessel has a tubular substrate layer and a conductive layer disposed on an outer surface of the substrate layer. In one embodiment of the present invention, the diameter of the simulated blood vessel, that is, the outer diameter thereof, is 0.5-10.0 mm. In another embodiment of the present invention, the diameter of the simulated blood vessel is preferably 0.7-5.0 mm and more preferably 1.0-3.0 mm. By setting the diameter of the substrate layer so as to be 0.5 mm or more, processing stability during molding and handling during production of the ulcer model are increased, and by setting the diameter of the simulated blood vessel so as to be 10 mm or less, replicability of a human blood vessel improves, and it is possible to suppress energization failures by an energy device.

The inner diameter of the simulated blood vessel is preferably 0.3-8.0 mm, more preferably 0.3-3.6 mm, and even more preferably 0.4-2.0 mm.

In one embodiment of the present invention, the thickness of the simulated blood vessel is 0.1-1.0 mm. In another embodiment of the present invention, the thickness of the simulated blood vessel is preferably 0.2-0.7 mm and more preferably 0.3-0.5 mm. By setting the thickness of the simulated blood vessel so as to be 1.0 mm or less, when gripped by an energy device, thermal conductivity improves and heat is conducted in a shorter time.

The simulated blood vessel in one embodiment of the present invention has, at a location where the conductive layer is disposed, a surface resistivity of $1.0 \times 10^0$ Ω/□ or more and $1.0 \times 10^6$ Ω/□ or less. More preferably, the simulated blood vessel has, at a location wherein the conductive layer is disposed, a surface resistivity of $1.0 \times 10^0$ Ω/□ or more and $1.0 \times 10^3$ Ω/□ or less, and even more preferably has a surface resistivity of $1.0 \times 10^0$ Ω/□ or more and $1.0 \times 10^2$ Ω/□ or less.

In the present embodiment, in accordance with JIS C 2139, the surface resistance value is measured under conditions of 23±1° C. using a Hiresta-UX MCP-HT800 and a Loresta-GP (MCP-T610) manufactured by Mitsubishi Chemical Analytech Co., Ltd. During measurement, evaluation is performed by using a sample obtained by press-molding a thermoplastic resin composition at 160-200° C., processing to a 2.5 cm×2.5 cm resin sheet having a thickness of 1.0 mm, and forming a conductive layer on a surface thereof.

In one embodiment of the present invention, both the substrate layer and the conductive layer have a total light transmittance of a certain level or higher, and the simulated blood vessel also has a total light transmittance of 70% or more. More preferably, the simulated blood vessel has a total light transmittance of 75% or more and, even more preferably, has a total light transmittance of 80% or more.

In the present embodiment, the total light transmittance can be measured, in accordance with JIS K 7136-1, by using a haze meter "NDH 7000" manufactured by Nippon Denshoku Industries, Co., Ltd. During measurement, evaluation is performed by using a sample obtained by processing a thermoplastic resin composition to a 1.0 mm thick resin sheet and forming a conductive layer on a surface thereof.

(Method for Producing Simulated Blood Vessel)

The simulated blood vessel of the present embodiment is produced by producing a substrate layer by extrusion molding a thermoplastic resin composition and coating an outer surface of the substrate layer with a dispersion fluid in which a conductive polymer is dispersed in a dispersion medium. In another embodiment, the simulated blood vessel is formed by performing a method in which the substrate layer is immersed in a conductive polymer dispersion fluid, etc.

Before coating with the conductive polymer dispersion fluid, it is preferable for the substrate layer to undergo a corona discharge treatment, a plasma discharge treatment, a flame treatment, or the like, to form a hydrophilic group (hydroxyl group, carbonyl group, etc.) on the substrate layer surface. When the substrate layer is treated so as to become hydrophilic, conductive layer adhesiveness can be further improved.

Second Embodiment

Figure 2:
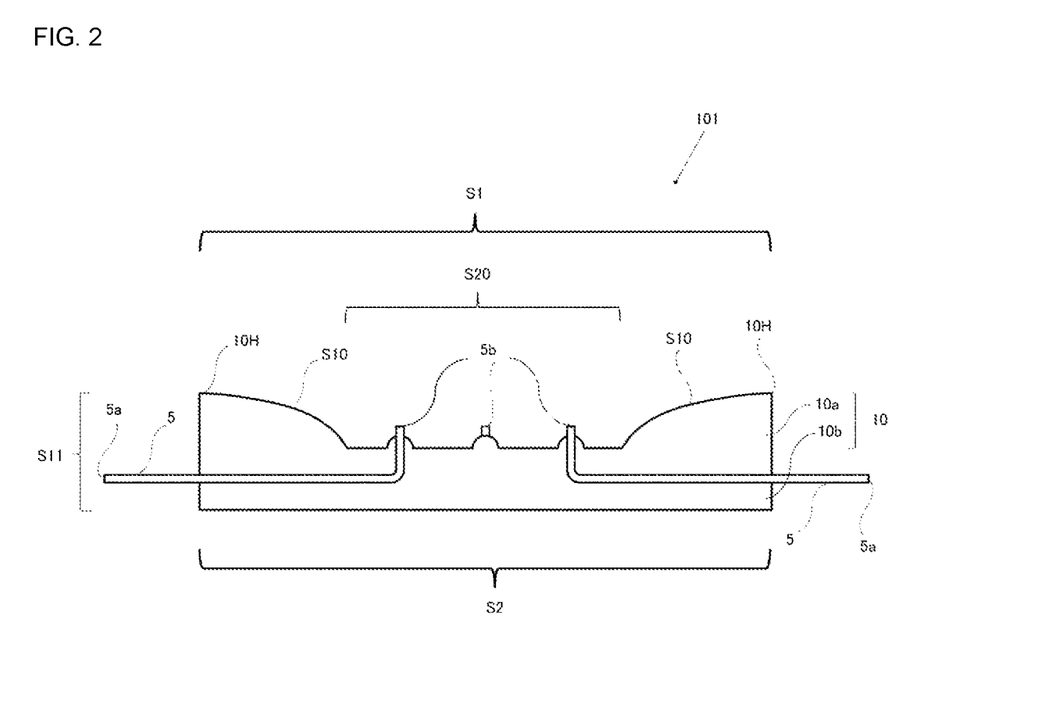
FIG. 2 shows a cross-section of an ulcer model according to a second embodiment of the present invention.
Figure 3:
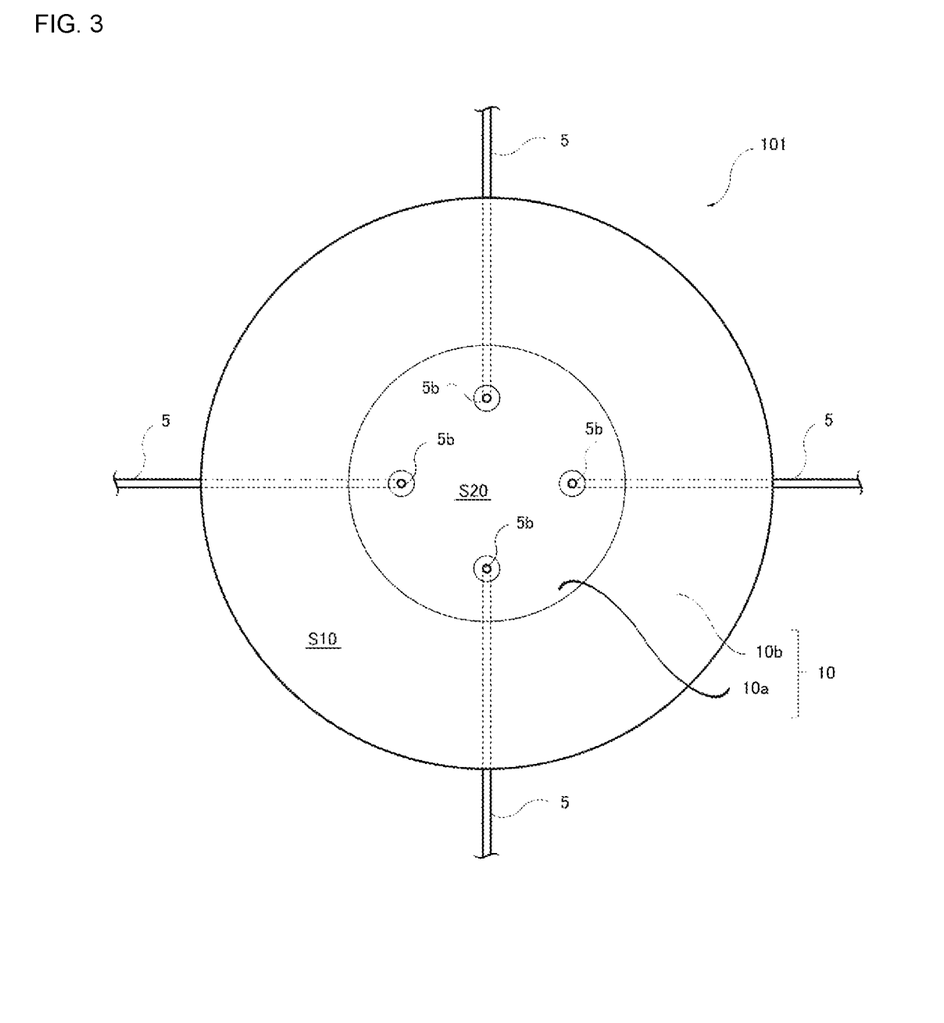
FIG. 3 is a top view of the ulcer model according to the second embodiment of the present invention.

An ulcer model 101 according to a second embodiment of the present invention has an upper surface S1 and a lower surface S2, which oppose one another, and a simulated blood vessel 5 according to the first embodiment provided between the upper surface S1 and the lower surface S2. FIG. 2 shows a cross-section of the ulcer model of the present embodiment, and FIG. 3 shows one embodiment of the ulcer model 101. The ulcer model 101 shown in FIGS. 2 and 3 is provided with a model body 10 having an upper surface S1 and an lower surface S2, which are substantially circular and oppose one another, an outer circumferential surface S11 which couples the outer edges of the upper surface S1 and the lower surface S2 in a continuous manner, and a tubular simulated blood vessel 5 which is provided between the upper surface S1 and the lower surface S2 and has an inlet opening section 5a and an outlet opening section 5b. The upper surface S1 includes an annular raised surface S10 which is raised in the thickness direction of the model body 10 and a simulated ulcer surface S20 which is a bottom surface of a recessed section surrounded by the raised surface S10. Here, the shape of the annular raised surface S10 may, as shown in FIG. 1, be a shape that conforms to a circular shape when seen from the upper surface S1. However, as long as the annular raised surface S10 is a shape that surrounds the simulated ulcer surface S20, there are no particular limitations thereon. For example, it is possible for the outer circumference and the inner circumference of the raised surface S10 to have, each independently, any arbitrary shape selected from among a circle, an ellipse, a polygon, and an indeterminate shape when the raised surface S10 is seen from the upper surface S1. In the same manner, it is possible for the outer circumference of the simulated ulcer surface S20 to have any arbitrary shape selected from among, for example, a circle, an ellipse, a polygon, and an indeterminate shape when the simulated ulcer surface 20 is seen from the upper surface S1. The simulated blood vessel 5 extends inside the model body 10 from the outer circumferential surface S11 of the model body 10 to the simulated ulcer surface S20 and is oriented with the outlet opening section 5b positioned on the simulated ulcer surface S20 side. In the same manner as the ulcer model 102 shown in FIG. 2, the simulated blood vessel 5 may bend at one or more locations.

The model body 10 in the embodiment shown in FIG. 3 is configured from a flat plated-shaped base part 10a including the simulated ulcer surface S20, and a raised part 10b which is provided on the base part 10a and forms the raised surface S10. The base part 10a and the raised part 10b may be molded bodies which are molded from the same or different molding materials. Properties such as hardness, etc., of the base part 10a and the raised part 10b can be selected in accordance with the kind of digestive tract anticipated, etc. For example, the hardness of a molded body forming the raised part 10b may be approximately the same as or lower than the hardness of a molded body forming the base part 10a. As shown in FIG. 3, there may be a plurality of simulated blood vessels 5.

The maximum width of the model body 10 in a direction perpendicular to the thickness direction thereof may be in a range corresponding to the breadth of a general ulcer, and may, for example, be in the range of 10-150 mm.

The simulated ulcer surface S20 is typically a flat surface located in the center of the upper surface S1. Note that, as described later, the simulated ulcer surface S20 may include a fine projection. The simulated ulcer surface S20 corresponds to the bottom surface of the recessed section in the upper layer S1 and is a part replicating an ulcer section in which the mucosal layer is deficient and a section corresponding to the submucosal layer is exposed. The maximum width of the simulated ulcer surface S20 may, for example, be in the range of 3-100 mm.

The raised surface S10 includes, as an apex 10H, a section at which the thickness of the model body 10 is the greatest. The thickness of the model body 10 at the apex 10H (that is, the maximum thickness of the model body 10) is not particularly limited and may be approximately 1-30 mm or approximately 2-20 mm.

The difference between the thickness of the model body 10 at the position of the apex 10H and the thickness of the model body 10 at the simulated ulcer surface S20 (the height difference between the apex 10H of the raised surface S10 and the simulated ulcer surface S20) is arbitrary, but may be in the range of about 10-90% with respect to the thickness of the model body 10 at the apex 10H.

The simulated blood vessel 5 passes through the model body 10 and is a passage for supplying simulated blood to the simulated ulcer surface S20 during hemostasis practice. The simulated blood vessel 5 may protrude to the outside of the model body 10 on the inlet opening section 5a side. The outlet opening section 5b of the simulated blood vessel 5 may be disposed in the vicinity of the inner side of the simulated ulcer surface S20 without reaching as far as the simulated ulcer surface S20. Even if the outlet opening section 5b does not reach the simulated ulcer surface S20, the simulated blood vessel 5 can easily be put in communication with the simulated ulcer surface S20, before technique practice, by a procedure such as resecting a section in the outlet opening section 5b vicinity, piercing with a needle, or pinching with tweezers, etc. The outlet opening section 5b may, for example, be disposed at a location at a depth of approximately 0.1-5 mm from the simulated ulcer surface S20.

An end section of the simulated blood vessel 5 may be connected to a syringe filled with simulated blood, and in that case, the simulated blood is supplied to the inside of the simulated blood vessel from the syringe. Instead of a syringe, any arbitrary device, tool, or equipment capable of supplying the simulated blood, for example, a tubular pump, may be used.

When the ulcer model 101 of the present embodiment is used, as long as the objective thereof is not inhibited, it is, for example, possible to use colorants such as pigments and dyes, and additives such as perfumes, antioxidizing agents, and antibacterial agents, etc. In order to make the ulcer model 101 of the present embodiment closely resemble an organ in a living body, the ulcer model 101 may be colored, with a colorant, in a color that closely resembles the organ in a living body.

In the ulcer model 101 of the present embodiment, as a resin for forming a layer having an appropriate hardness, it is possible to use, for example, a hydrous polyvinyl alcohol-based material containing a polyvinyl alcohol and water, or a hydrocarbon-based resin material containing a lipophilic resin and oil. The hardness of a molded body can be appropriately adjusted by, for example, the water content of the hydrous polyvinyl alcohol-based material, the amount of oil in the hydrocarbon-based resin material, and/or the amount of ionic liquid therein.

The ulcer model 101 according to the present embodiment can be produced by a normal molding method. For example, the ulcer model 101 may be produced by setting a tube which is to serve as the simulated blood vessel 5 inside a cavity of a mold having a shape corresponding to the upper surface S1 and the lower surface S2 and then molding.

The molded body of the hydrous polyvinyl alcohol-based material can be formed, for example, by a method in which a molding composition containing a polyvinyl alcohol, a crosslinking agent (boric acid, or the like), water, and an ionic liquid, etc., is poured into a mold and then gelated, or a method in which the same molding composition is poured into a mold and then repeatedly frozen by cooling to below the melting point thereof and melted by heating to the above the melting point to promote gelation. The molded article of the hydrocarbon-based resin material can be formed, for example, by a molding method such as extrusion, casting, vacuum molding, and injection molding including multiple colors.

The ulcer model 101 can be mounted on an upper digestive tract organ (stomach, esophagus, duodenum) model and used to practice endoscopic hemostasis, etc. The ulcer model may be fitted in a model-mounting section provided in the digestive tract model or the ulcer model may be attached to an inner wall of the digestive tract model. The model-mounting section of the digestive tract model may be a frame or indentation formed where a portion of the wall is deficient, or a model-mounting jig may be attached to the inner wall of the digestive tract model. The ulcer model may be attached to the inner wall by using a bond, an adhesive, double-sided tape, etc.

Examples of techniques including hemostasis include so-called mechanical techniques in which a hemorrhaging ulcer site is gripped by hemostatic forceps or clips, and thermocoagulation techniques such as thermocoagualation using an energy device, etc. Examples of energy devices include electric scalpels, ultrasonic scalpels, and high-frequency radio wave scalpels, etc.

EXAMPLES

The present invention shall be explained in more detail below by disclosing examples, but interpretation of the present invention is not limited by these examples.

The raw materials and production method used in the examples, etc. are as follows.

(A) Substrate Layer
  Ethylene-vinyl acetate-based resin (EVA): Evaflex EV170, manufactured by Dow-Mitsui Polychemicals
  Ethylene-vinyl acetate-based resin (EVA): Ultrasen 640, manufactured by Tosoh Corporation
  Thermoplastic polyurethane elastomer resin (urethane): Elastollan ET 880, manufactured by BASF SE
  Vinyl chloride resin (PVC): TH-1000, manufactured by Taiyo Vinyl Corporation
  Hydrogenated styrene-butadiene elastomer resin (HSBR): JSR DYNARON 1320P, manufactured by JSR Corporation
  1,2-polybutadiene elastomer resin (BR): JSR RB810, manufactured by JSR Corporation
  Low density polyethylene resin (LDPE): UBE Polyethylene B128, manufactured by Ube-Maruzen Polyethylene Co., Ltd.
  Hydrogenated styrene/ethylene/butylene/styrene block resin (SEBS): JSR DYNARON 8300P, manufactured by JSR Corporation (for DYNARON 8300P, a clear melting point for forming a pseudo-crosslink is not indicated)

(B) Conductive Layer
  Polythiophene-based conductive polymer dispersion fluid (Denatron PT-436, manufactured by Nagase ChemteX Corporation; pure/alcohol dispersion fluid)

(C) Body of Ulcer Model
(C-1) Hydrogenated Styrene-Based Thermoplastic Elastomer
  SEEPS (SEPTON 4055, manufactured by Kuraray Co., Ltd.) (MFR (temperature 230° C., load 2.16 kg) 0.0 g/10 min.; styrene content 30 mass %; hydrogenation ratio 90 mol % or more)
(C-2) Oil
  Paraffin oil (Diana Process Oil PW 90, manufactured by Idemitsu Kosan Co., Ltd.)

Example 1

(Production of Simulated Blood Vessel)

Using an ethylene-vinyl acetate-based resin (Evaflex EV170, manufactured by Dow-Mitsui Polychemicals) as the thermoplastic resin composition, a tubular structure having a diameter of 1.0 mm and a thickness of 0.25 mm was fabricated by extrusion molding and used as a substrate layer. The substrate layer surface underwent surface modification by a corona treatment. The corona treatment was carried out by using a corona surface modification evaluation device (TEC-4AX) manufactured by Kasuga Denki, Inc., under conditions of an output of 80 W, a speed of 0.5 m/min., and a clearance between electrode and substrate of 5 mm.

Next, as a conductive layer, a polythiophene-based conductive polymer dispersion fluid, Denatron PT-436 (manufactured by Nagase ChemteX Corporation; pure/alcohol dispersion fluid), was prepared, coated on an outer surface of the substrate layer, dried for 24 hours in a room temperature environment, and used as a simulated blood vessel having a conductive layer with a thickness of 180 nm.

(Production of Ulcer Model)

To 100 parts by mass of the hydrogenated styrene-based thermoplastic elastomer, 300 parts by mass of oil was added dropwise and allowed to sufficiently impregnate the elastomer. This was allowed to stand for 24 hours in a 23° C.±1° C. environment and then kneaded for 10 minutes at 180° C.

and a rotation speed of 100 rotations/min. using a Brabender Plasti-Corder (PL 2000, manufactured by Brabender GmbH).

A mold was filled with the thermoplastic resin composition having the hydrogenated styrene-based thermoplastic elastomer and oil mixed therein and fusion-molded at 160° C. for five minutes at a pressure of 10 MPa.

Figure 4:
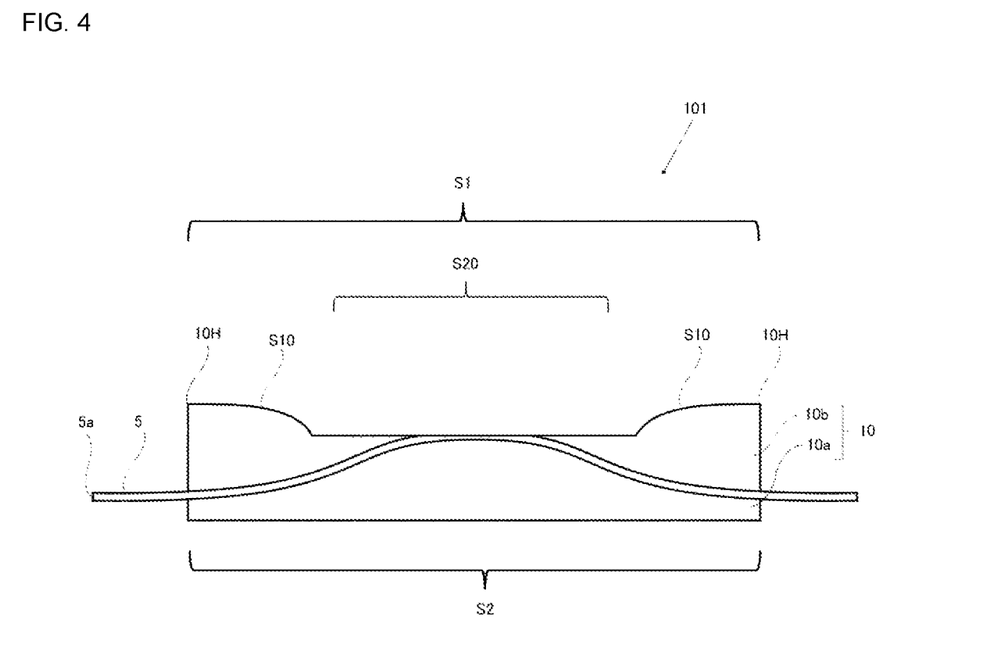
FIG. 4 shows a cross-section of a modified example of the ulcer model according to the second embodiment of the present invention.

A simulated blood vessel was set in the molded ulcer model in the same manner as shown in FIGS. 2, 3, and 4.

Next, a syringe filled with simulated blood was connected to an end section of the blood vessel.

Examples 2-6

Other than changing the diameter and thickness of the substrate layer, simulated blood vessels and ulcer models were fabricated in the same manner as in Example 1.

Example 7

Other than changing the thermoplastic resin composition of the substrate layer to an ethylene-vinyl acetate-based resin (Ultrasen 640), a simulated blood vessel and ulcer model were fabricated in the same manner as in Example 1.

Example 8

Other than changing the thermoplastic resin composition of the substrate layer to a thermoplastic polyurethane elastomer resin (Elastollan ET 880), a simulated blood vessel and ulcer model were fabricated in the same manner as in Example 1.

Example 9

Other than changing the thermoplastic resin composition of the substrate layer to a resin composition obtained by blending 45 parts by mass of an adipic acid-based polyester compound (ADEKA CIZER PN-9302) with respect to 100 parts by mass of a vinyl chloride resin (TH-100), a simulated blood vessel and ulcer model were fabricated in the same manner as in Example 1.

Example 10

Other than changing the thermoplastic resin composition of the substrate layer to a hydrogenated styrene-butadiene elastomer resin (DYNARON 1320P), a simulated blood vessel and ulcer model were fabricated in the same manner as Example 1.

Example 11

Other than changing the thermoplastic resin composition of the substrate layer to a 1,2-polybutadiene elastomer resin (RB810), a simulated blood vessel and ulcer model were fabricated in the same manner as in Example 1.

Comparative Example 1

Other than not forming a conductive layer, a simulated blood vessel and ulcer model were fabricated in the same manner as in Example 1.

Comparative Example 2

Other than changing the thermoplastic resin composition of the substrate layer to a low density polyethylene resin (B128), a simulated blood vessel and ulcer model were fabricated in the same manner as in Example 1.

Comparative Example 3

Other than changing the thermoplastic resin composition of the substrate layer to a hydrogenated styrene/ethylene/butylene/styrene block resin (DYNARON 8300P), a simulated blood vessel and ulcer model were fabricated in the same manner as Example 1.

The evaluation methods for the various characteristics of the thermoplastic resin compositions used in the examples, etc., are as follows.

(1) Tensile Modulus of Elasticity

In accordance with the JIS K 7127 plastic tensile testing method, a type 5 test piece shape was punched out from a 1.0 mm thick sheet and measurements were performed by using a tensile testing machine (Autograph AG-Xplus, manufactured by Shimadzu Corporation) in an environment of 23±1° C. under conditions of a tensile speed of 50.0 mm/min. The tensile modulus of elasticity was calculated from the slope of the initial straight line in a stress-strain curve.

(2) Water Contact Angle

In accordance with JIS K 6768 and using an automatic contact angle measurement device OCA20 manufactured by Eko Instruments, Co., Ltd. under conditions of 23±1° C., 1 µL of water (pure water) was dripped onto the substrate layer surface and the contact angle after 30 seconds was measured. Note that during measurement, evaluation was performed by using samples obtained by press-molding the thermoplastic resin compositions of the examples, etc., at 160-200° C., processing to a resin sheet having a thickness of 1.0 mm, and subjecting a surface thereof to a corona treatment. The corona treatment was carried out by using a corona surface modification evaluation device (TEC-4AX) manufactured by Kasuga Denki, Inc., under conditions of an output of 80 W, a speed of 0.5 m/min., and a clearance between electrode and substrate of 5 mm.

(3) Melting Point

The melting point was measured using a differential scanning calorimeter (DSC; DSC 3+manufactured by Mettler Toledo) in a nitrogen atmosphere at a temperature increase rate of 10° C./min.

The evaluation methods for the various characteristics of the simulated blood vessels prepared in the examples, etc., are as follows.

(4) Conductivity Evaluation

In accordance with JIS C 2139, surface resistivity was measured under conditions of 23±1° C. using a Hiresta-UX MCP-HT800 and a Loresta-GP (MCP-T610) manufactured by Mitsubishi Chemical Analytech Co., Ltd. During measurement, evaluation was performed by using samples obtained by press-molding the thermoplastic resin compositions of the examples, etc., at 160-200° C., processing to a 2.5 cm×2.5 cm resin sheet having a thickness of 1.0 mm, and forming a conductive layer on a surface thereof. In Comparative Example 1, the sample used did not have a conductive layer formed thereon.

A surface resistivity of $1.0 \times 10^0$ Ω/□ or more and $1.0 \times 10^3$ Ω/□ or less was deemed to be excellent; a surface resistivity of more than $1.0 \times 10^3$ Ω/□ and $1.0 \times 10^6$ Ω/□ or less was deemed to be good; and a surface resistivity of more than $1.0 \times 10^6$ Ω/□ was deemed to be poor.

(5) Total Light Transmittance

Based on a total light transmittance measured in accordance with JIS K 7136-1 and using a haze meter "NDH 7000" manufactured by Nippon Denshoku Industries, Co., Ltd. under conditions of 23±1° C., a determination regarding the total light transmittance was made in accordance with the following criteria. Note that during measurement, evaluation was performed by using samples obtained by processing the thermoplastic resin compositions of the examples, etc., to a 1.0 mm thick resin sheet and forming a conductive layer on a surface thereof. In Comparative Example 1, the sample used did not have a conductive layer formed thereon.

The evaluation methods for the various characteristics of the ulcer models using the simulated blood vessels fabricated in the examples, etc., are as follows.

(6) Simulated Blood Vessel Section Gripping Evaluation

In a state in which the simulated blood vessel protruding from the model body was pinch-gripped using an electric scalpel (high frequency surgical device "VIO 100C", manufactured by Erbe Co., Ltd.; conditions: bipolar, coagulation mode, 60 W), a visual evaluation as to whether or not simulated blood is eluted was performed. Cases in which elution does not occur were deemed to be excellent, and cases in which elution does occur were deemed to be poor.

(7) Evaluation of Replicability of Hemostasis Operability

A hemostasis operation was carried out using an electric scalpel (conditions: bipolar, coagulation mode, 60 W) on a simulated blood vessel eluting simulated blood, and the degree of elution of the simulated blood in the hemostasis operation was visually evaluated. Cases in which hemostasis is replicated by the hemostasis operation were deemed to be excellent and cases in which hemostasis was not replicated were deemed to be poor.

The results are shown in Table 1.

TABLE 1

| | EX 1 | EX 2 | EX 3 | EX 4 | EX 5 | EX6 | EX7 |
|---|---|---|---|---|---|---|---|
| MATERIAL OF SUBSTRATE LAYER | EVA | EVA | EVA | EVA | EVA | EVA | EVA |
| SUBSTRATE LAYER | EVAFLEX EV170 | EVAFLEX EV170 | EVAFLEX EV170 | EVAFLEX EV170 | EVAFLEX EV170 | EVAFLEX EV170 | ULTRASEN 640 |
| MELTING POINTT [° C.] | 62 | 62 | 62 | 62 | 62 | 62 | 76 |
| TENSILE MODULUS OF ELASTICITY [MPa] | 7.5 | 7.5 | 7.5 | 7.5 | 7.5 | 7.5 | 20 |
| DIAMETER [mm] | 1 | 1.5 | 0.5 | 5 | 10 | 10 | 1 |
| THICKNESS [mm] | 0.2 | 0.3 | 0.1 | 0.5 | 0.1 | 1 | 0.2 |
| TUBE GRIPPING PROPERTIES | EXCELLENT | EXCELLENT | EXCELLENT | EXCELLENT | EXCELLENT | EXCELLENT | EXCELLENT |
| TOTAL LIGHT TRANSMITTANCE [%] | 90.7 | 90.7 | 90.7 | 91 | 91 | 91 | 94 |
| CONTACT ANGLE [°] | 35 | 35 | 35 | 20 | 20 | 20 | 20 |
| CONDUCTIVE LAYER | ○ | ○ | ○ | ○ | ○ | ○ | ○ |
| CONDUCTIVE POLYMER | POLYTHIO-PHENE | POLYTHIO-PHENE | POLYTHIO-PHENE | POLYTHIO-PHENE | POLYTHIO-PHENE | POLYTHIO-PHENE | POLYTHIO-PHENE |
| SURFACE RESISTANCE VALUE ($\Omega/\square$) | $10^1$-$10^4$ | $10^1$-$10^4$ | $10^1$-$10^4$ | $10^1$-$10^4$ | $10^1$-$10^4$ | $10^1$-$10^4$ | $10^1$-$10^4$ |
| ELECTRIC DEVICE | EXCELLENT | EXCELLENT | EXCELLENT | EXCELLENT | EXCELLENT | EXCELLENT | EXCELLENT |

| | EX 8 | EX 9 | EX 10 | EX 11 | COMP EX 1 | COMP EX 2 | COMP EX 3 |
|---|---|---|---|---|---|---|---|
| MATERIAL OF SUBSTRATE LAYER | URETHANE | PVC | HSBR | BR | EVA | LDPE | SEBS |
| SUBSTRATE LAYER | ELASTOLLAN ET880 | TH-1000 | DYNARON 1320P | RB810 | EVAFLEX EV170 | POLYETHYLENE 8128 | DYNARON 8300P |
| MELTING POINTT [° C.] | 165 | 180 | 98 | 74 | 62 | 114 | — |
| TENSILE MODULUS OF ELASTICITY [MPa] | 12.3 | 21 | 13 | 15 | 7.5 | 114 | 3 |
| DIAMETER [mm] | 1 | 1 | 1 | 1 | 1 | 1 | 1 |
| THICKNESS [mm] | 0.2 | 0.2 | 0.2 | 0.2 | 0.2 | 0.2 | 0.2 |
| TUBE GRIPPING PROPERTIES | EXCELLENT | EXCELLENT | EXCELLENT | EXCELLENT | EXCELLENT | POOR | EXCELLENT |
| TOTAL LIGHT TRANSMITTANCE [%] | 90.5 | 80 | 89 | 85 | 93 | 71 | 88 |
| CONTACT ANGLE [°] | 20 | 20 | 20 | 20 | 35 | 35 | 35 |
| CONDUCTIVE LAYER | ○ | ○ | ○ | ○ | x (UNCOATED) | ○ | ○ |
| CONDUCTIVE POLYMER | POLYTHIO-PHENE | POLYTHIO-PHENE | POLYTHIO-PHENE | POLYTHIO-PHENE | — | POLYTHIO-PHENE | POLYTHIO-PHENE |
| SURFACE RESISTANCE VALUE ($\Omega/\square$) | $10^1$-$10^4$ | $10^1$-$10^4$ | $10^1$-$10^4$ | $10^1$-$10^4$ | $>10^7$ | $10^1$-$10^4$ | $10^1$-$10^4$ |
| ELECTRIC DEVICE | EXCELLENT | EXCELLENT | EXCELLENT | EXCELLENT | POOR | POOR | POOR |

As can be understood from Table 1, it was shown that the simulated blood vessels of the examples are able to replicate hemorrhaging and can be used to practice hemostasis using an energy device. Meanwhile, in the simulated blood vessels of Comparative Example 1, which does not comprise a conductive layer, Comparative Example 2, which used a thermoplastic resin having a high tensile modulus of elasticity, and Comparative Example 3, which used a thermoplastic resin having an unknown melting point, replicability of hemostasis by a hemostasis operation, in particular, was insufficient, and thus, these simulated blood vessels were not suitable for practicing hemostasis using an energy device.

INDUSTRIAL APPLICABILITY

The simulated blood vessel and ulcer model according to the present invention can be utilized as a practice tool for hemostasis using an energy device.

REFERENCE SIGNS LIST

5 Simulated blood vessel
5a Inlet opening section
5b Outlet opening section
10 Model body
10H Apex of raised surface
10a Base part
10b Raised part
101 Ulcer model
S1 Upper surface
S2 Lower surface
S10 Raised surface
S11 Outer circumferential surface
S20 Simulated ulcer surface

The invention claimed is:

1. A simulated blood vessel comprising a tubular substrate layer and a conductive layer disposed on at least a portion of an outer surface of the substrate layer, wherein:
the substrate layer is a substrate layer molded from a thermoplastic resin composition having a tensile modulus of elasticity of 0.01-50 MPa and a melting point of 50-200° C.; and
the conductive layer contains a conductive polymer.

2. The simulated blood vessel according to claim 1, wherein the simulated blood vessel has a surface resistance value of $1.0\times10^0$-$1.0\times10^6 \Omega/\square$ at a location where the conductive layer is disposed.

3. The simulated blood vessel according to claim 1, wherein the simulated blood vessel has a total light transmittance, measured in accordance with JIS K 7136-1, of 70% or more.

4. The simulated blood vessel according to claim 1, wherein the substrate layer has a diameter of 0.5-10.0 mm and a thickness of 0.1-2.0 mm.

5. The simulated blood vessel according to claim 1, wherein the substrate layer surface has a water contact angle of 45° or less.

6. The simulated blood vessel according to claim 1, wherein the thermoplastic resin composition contains a thermoplastic resin selected from the group consisting of ethylene-vinyl acetate-based resins, urethane-based resins, vinyl chloride-based resins, polybutadiene-based thermoplastic elastomers, and hydrogenated styrene-based thermoplastic elastomers.

7. The simulated blood vessel according to claim 1, wherein the conductive layer contains a π-conjugated conductive polymer.

8. An ulcer model comprising an upper surface and a lower surface, which oppose one another, and the simulated blood vessel according to claim 1 provided between the upper surface and the lower surface, wherein the ulcer model is to be used for practicing techniques including hemostasis.

9. The ulcer model according to claim 8, wherein the simulated blood vessel is connected to a device that can supply simulated blood to the inside of the simulated blood vessel.

10. The ulcer model according to claim 8, wherein the technique including hemostasis is endoscopic hemostasis.

11. The ulcer model according to claim 8, wherein the hemostasis is hemostasis by thermocoagulation using an energy device.

12. The ulcer model according to claim 8, wherein the hemostasis is hemostasis by gripping the ulcer model surface with hemostatic forceps or clips.

* * * * *